(12) United States Patent
Kaliarajan et al.

(10) Patent No.: US 10,346,515 B2
(45) Date of Patent: Jul. 9, 2019

(54) SYSTEMS AND METHODS FOR PRINTING ELECTRONIC DOCUMENTS THAT CONTAIN HYPERLINKS

(71) Applicant: XEROX CORPORATION, Norwalk, CT (US)

(72) Inventors: Naveenraj Kaliarajan, Kollampalayam (IN); Anand Arokia Raj Antony Muthu Rayar, Chennai (IN)

(73) Assignee: Xerox Corporation, Webster, NY (US)

( * ) Notice: Subject to any disclaimer, the term of this patent is extended or adjusted under 35 U.S.C. 154(b) by 4 days.

(21) Appl. No.: 15/498,811

(22) Filed: Apr. 27, 2017

(65) Prior Publication Data

US 2018/0314675 A1    Nov. 1, 2018

(51) Int. Cl.
  *G06F 17/00* (2019.01)
  *G06F 17/22* (2006.01)
  *G06F 3/12* (2006.01)

(52) U.S. Cl.
  CPC ........ *G06F 17/2235* (2013.01); *G06F 3/1206* (2013.01); *G06F 3/1242* (2013.01); *G06F 3/1246* (2013.01); *G06F 3/1285* (2013.01); *G06F 17/2229* (2013.01)

(58) Field of Classification Search
  CPC .. G06F 17/2235; G06F 3/1246; G06F 3/1248; G06F 3/125; G06F 3/1256; G06F 17/212; G06F 3/1206; G06F 3/1242; G06F 3/1285; G06F 17/2229
  USPC .......................................................... 715/206
  See application file for complete search history.

(56) References Cited

U.S. PATENT DOCUMENTS

| | | | |
|---|---|---|---|
| 7,107,526 B1 * | 9/2006 | Weller | G06F 17/30899 707/E17.119 |
| 7,251,784 B2 | 7/2007 | Kessenich et al. | |
| 7,949,791 B2 | 5/2011 | Serena | |
| 8,127,219 B1 * | 2/2012 | Gupta | G06F 17/241 715/205 |
| 2010/0123908 A1 * | 5/2010 | Denoue | G06F 17/212 358/1.6 |
| 2015/0154157 A1 * | 6/2015 | Itogawa | G06F 17/30879 715/205 |

* cited by examiner

*Primary Examiner* — Jason T Edwards
(74) *Attorney, Agent, or Firm* — Jones Robb, PLLC (57) ABSTRACT

The present disclosure discloses methods and systems for printing an input electronic document that contains one or more hyperlinks. According to the disclosed method, the input electronic document is received for printing. Then, one or more hyperlinks are detected and corresponding hyperlink destinations are extracted. Thereafter, one or more reference pages are added at an end of the input electronic document to create a final document for printing, the one or more reference pages list the extracted hyperlinks and corresponding hyperlink destinations. The final document is submitted to a printer for printing.

19 Claims, 6 Drawing Sheets

Page 1 of the final print-out

Digital sampling of any signal, whether sound, digital photographs, or other, can result in apparent signals at frequencies well below anything present in the original. Aliasing occurs when a signal is sampled at a less than twice the highest frequency present in the signal. If an audio signal of containing a ultrasonic 45 kHz tone is sampled at 44.75 kHz, the resulting signal contains a 0.25 kHz tone, approximately middle C!

The red dots are what are recorded, since they represent the signal values at the times the signal is sampled. The pattern of the red dots is a terrible representation of the signal. The red sampled data looks like a sine wave at about *one-tenth* the frequency of the original! This is <u>aliasing</u>.

Were nothing done to control aliasing, the effect on musical recordings would be devastating. In the above case, the presence of an ultrasonic harmonic in the signal from the microphone would result in a low pitched tone present in playback. Signals at frequencies above half the sampling rate *must* be filtered out to avoid the creation of signals at frequencies not present in the original sound. Thus digital sound recoding equipment contains low-pass filters that remove any signals above half the sampling frequency.

Aliasing can also cause problems in digital imaging. In images, the repetition is in space rather than time. If a repetitive pattern of high spatial frequency is sampled at low resolution, <u>Moiré</u> patterns result. These are particularly troublesome when scanning half-tone magazine or newspaper photos, where the dot spacing may be as high or higher than the sampling frequency.

The phenomenon is most easily understood with a regularly repeating subject. In the discussion below, I have created aliasing using a "pixel resize" in Paint Shop Pro. The effect is the same as if one were to take a digital photo without antialias filtering.

SYSTEMS AND METHODS FOR PRINTING ELECTRONIC DOCUMENTS THAT CONTAIN HYPERLINKS

TECHNICAL FIELD

The presently disclosed embodiments are directed to printing of electronic documents, and more particularly to systems and methods for printing of electronic documents that contain hyperlinks.

BACKGROUND

An electronic document is a document existing in electronic form that is accessible by computer technology. The electronic document may have a variety of file formats, examples of which include, but are not limited to, Portable Document Format (PDF), Microsoft DOC format, Hypertext Markup Language (HTML) format, Extensible Markup Language (XML) format, Microsoft XLS format, Tag Image File Format (TIFF), and other file formats that can be associated with the electronic document.

Sometimes, the electronic document includes one or more hyperlinks pointing to one or more hyperlink destinations. Upon clicking a hyperlink, a program application is launched to open the content located at the hyperlink destination. To differentiate a hyperlinked content from the remaining content within the electronic document, the hyperlink may be displayed in a different color.

An example of a hyperlink destination is a Uniform Resource Locator (URL). A URL is a global address of documents and other resources on the World Wide Web (www) and is a string of characters conforming to a standardized format that refers to data on the Internet by their location. An example of a URL is http://www.xerox.com/products/index.html.

However, when the content containing embedded hyperlinks is printed, the hyperlinks are not highlighted and the hyperlink destinations are not listed anywhere in the print out as reference links for offline readers. Since the embedded hyperlink destinations are not printed with the content, information regarding the hyperlink destinations is lost in print. A user reading the printed content may therefore not be able to identify the hyperlink destinations. This limits/blocks the referencing capability of the reader and he has to rely on the original soft copy of the electronic document.

It may therefore be advantageous to provide methods and systems to enable the user to identify and access the hyperlink destinations embedded in the print content, without having to refer to a soft copy of the printed content.

SUMMARY

According to aspects illustrated herein, a method for printing an input electronic document is disclosed. The method includes receiving the input electronic document for printing. Then, one or more hyperlinks in the input electronic document are detected. One or more hyperlink destinations corresponding to the one or more detected hyperlinks are extracted. Thereafter, one or more reference pages are added at the end of the input electronic document to create a final document for printing, wherein the one or more reference pages list the one or more detected hyperlinks and corresponding one or more hyperlink destinations. The final document is submitted to a printer for printing the input electronic document and the one or more reference pages.

According to further aspects illustrated herein, a method for printing an electronic document is disclosed. The method includes receiving the electronic document for printing. Then, one or more hyperlinks in the electronic document are detected. A confirmation from a user is received if the user wants to print one or more reference pages containing the one or more detected hyperlinks. One or more hyperlink destinations corresponding to the one or more detected hyperlinks are extracted, upon receiving a confirmation from the user. Thereafter, one or more reference pages are created, wherein the one or more reference pages list the one or more detected hyperlinks and corresponding hyperlink destinations. The one or more reference pages are added at the end of the electronic document to generate a final document for printing. The final document is submitted to a printer for printing.

According to further aspects illustrated, a system for printing an input electronic document that contains one or more hyperlinks is disclosed. The system includes a printer device for receiving and executing one or more print job requests. The system further includes a computing device communicatively coupled to the printer device, the computing device includes a memory for storing one or more instructions, and a processor in communication with the memory, wherein upon execution of the one or more instructions, the processor is configured to receive the input electronic document for printing; detect one or more hyperlinks in the input electronic document; extract one or more hyperlink destinations corresponding to the one or more detected hyperlinks; add one or more reference pages at the end of the input electronic document to create a final document for printing, wherein the one or more reference pages list the one or more detected hyperlinks and corresponding one or more hyperlink destinations; and submit the final document for printing along with the one or more reference pages to the printer device.

According to further aspects illustrated, a computing device is disclosed. The computing device includes a hyperlink processing module configured to receive an electronic document, wherein the electronic document includes one or more pages, wherein at least one page comprises one or more hyperlinks; analyze the electronic document to detect the one or more hyperlinks; receive a confirmation through a Graphical User Interface (GUI) of the computing device, if a user wants to print one or more reference pages containing the one or more detected hyperlinks; extract one or more hyperlink destinations corresponding to the one or more detected hyperlinks, upon receiving a confirmation from the user; create the one or more reference pages, the one or more reference pages list the one or more extracted hyperlinks and corresponding hyperlink destinations; and submit the electronic document along with the one or more reference pages to a print driver. The computing device includes the print driver communicatively coupled to the hyperlink processing module for submitting the electronic document along with the one or more reference pages, to a printer device for printing the electronic document and the one or more reference pages.

BRIEF DESCRIPTION OF THE DRAWINGS

FIG. 2C illustrates an exemplary first page of a final print out of the input e-document, in accordance with an embodiment.

DETAILED DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "printer device" refers to a printer that is configured to receive and execute one or more print job requests. In context of the present disclosure, the printer device processes documents containing hyperlinks and prints the documents along with additional pages (i.e., reference pages) as submitted by a computing device. An alternative of the printer may be a multi-function device.

The term "input electronic document" refers to an electronic document submitted for printing via a user computing device. The electronic document may have a variety of file formats, examples of which include, but are not limited to, Portable Document Format (PDF), Microsoft DOC format, Hypertext Markup Language (HTML) format, Extensible Markup Language (XML) format, Microsoft XLS format, and Tag Image File Format (TIFF). The electronic document may include one or more pages. The input electronic document may interchangeably be used with the "phrase electronic document," or "e-document." The input electronic document refers to a soft copy.

The term "hyperlinks" includes content, which is hyperlinked to a source or a destination. This phrase may interchangeably be used with the phrase hypertext (i.e., text which is hyperlinked to a source/link).

The term "reference page" refers to a new page added at the end of the input electronic document that lists the embedded hyperlinks of the input electronic document and corresponding URLs. The reference page may interchangeably be used with the phrase "index page" or "annexure."

The term "final document" refers to a document including the input electronic document along with one or more reference pages listing one or more hyperlinks and corresponding URLs.

The term "computing device" refers to a user device that includes a processor/microcontroller and/or any other digital component, or a device or a system that performs one or more operations according to one or more programming instructions. In the context of the present disclosure, the computing device is a user device that executes a printer driver application and a hyperlink processing module. The hyperlink processing module may be integrated with the print driver application or may be separately running on the computing device, without deviating from the scope of the disclosure. The hyperlink processing module manages documents with hyperlinks, the details of which will be discussed below. Examples of the computing device include, but are not limited to, personal computer, a laptop, a mobile phone, tablet, PDA, a smart phone or any other device capable of data communication.

Overview

Generally, when an electronic document containing embedded hyperlinks is printed, the hyperlinks are not highlighted and the hyperlink destinations are not listed anywhere in the print out as reference links for offline readers. Since the embedded hyperlink destinations are not printed with the content, information regarding the hyperlink destinations is lost in print outs. A user reading the printed content may therefore not be able to identify the hyperlink destinations that are embedded within the content. This limits/blocks the referencing capability of the reader and wants him to rely on the original soft copy of the content.

In light of the above, the disclosure discloses methods and systems for automatically extracting hyperlinks in a document that is sent for printing and then automatically listing those discovered hyperlinks to a new printed index page that is printed at the end of the original document. The new printed index page enables a user to refer the hyperlinks and corresponding hyperlink destinations and thus enhances reading capability of the user.

The key difference of the present disclosure from existing approaches is that the embedded hyperlinks of an electronic document submitted for printing are listed as an annexure in the final print out of the electronic document. The annexure containing extracted hyperlinks and hyperlink destinations may be very helpful for the offline readers for any future reference, as they do not need to go back to the input e-document for identifying hyperlinks. Various embodiments of the present disclosure provide a new product feature by leveraging current technologies of extracting hyperlinks from electronic documents.

Exemplary Embodiments

Figure 1:
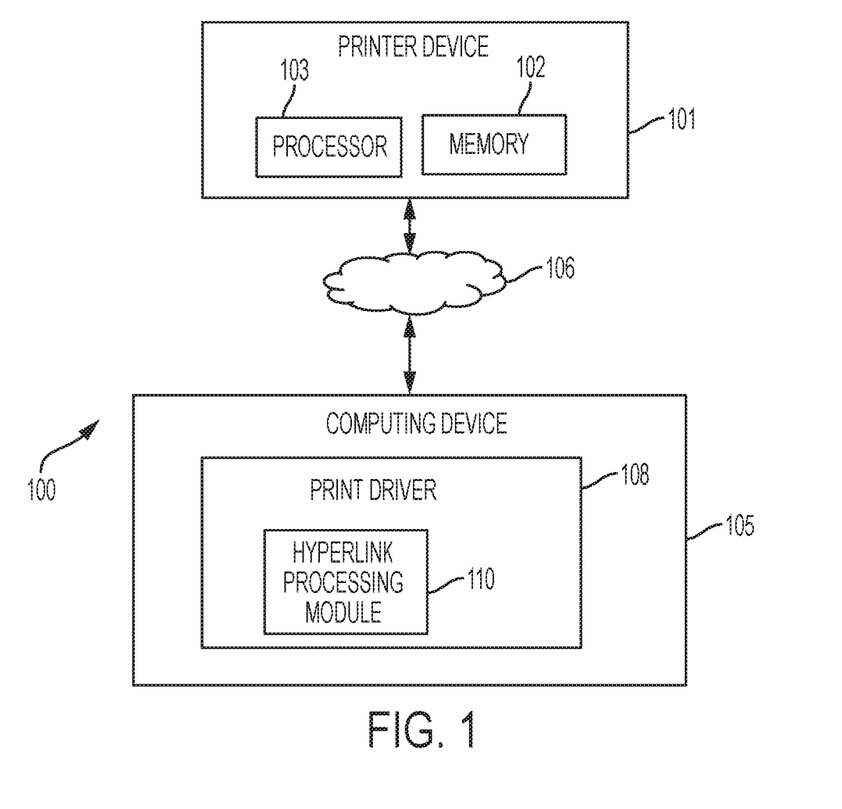
FIG. 1 illustrates an exemplary environment, wherein various embodiments of the present disclosure can be practiced.

FIG. 1 illustrates an exemplary environment 100, wherein various embodiments of the present disclosure can be practiced. The exemplary environment 100 includes a printer device 101 that includes a memory 102 to store one or more instructions, and a processor 103 in communication with the memory 102 to perform at least one function of printing, scanning or copying according to the one or more programming instructions. Examples of the printer device 101 include, but are not limited to, a multifunction peripheral (MFP), a multifunction device (MFD), a printer, or the like.

The environment 100 further includes a computing device 105 connected to the printer device 101 through a USB connection (not shown) or through a communication network 106. The communication network 106 may be a wireless network, a wired network or a combination thereof. The communication network 106 may be implemented as one of the different types of networks, such as intranet, Local Area Network (LAN), Wide Area Network (WAN), the Internet, and the like. The communication network 106 may be either a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

Various examples of the computing device 105 may include, but not limited to, a desktop PC, laptop, a notebook, a workstation, a personal digital assistant (PDA), a mainframe computer, a mobile computing device, a mobile device, an internet appliance, and so on. In all, the computing device 105 may be any electronic device that can be used by a user for giving print commands or submitting documents for printing.

The computing device 105 includes a memory (not shown), a processor (not shown), and a print driver 108. The memory stores information related to the user as well as details, which are being accessed by the user when using the computing device 105. Further, the memory stores various settings of the computing device 105 such as operating system, language, processor type, installed memory, etc., of the computing device 105. As shown, the memory may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

The processor processes all requests from the user, allocate resources and the like.

An application (although not shown) runs on the computing device 105 such as MS word, MS Excel, MS power point or any other application that can be used by the user for his daily tasks or otherwise. Using the application, the user gives one or more print commands, which are then sent to the print driver 108 of the computing device 105.

The print driver 108 runs on the computing device 105 and manages one or more print commands as submitted by the user. The print driver 108 provides a graphical user interface (GUI) on a display of the computing device 105, for enabling a user to manage and submit print job requests to the printer device 101. When a user submits a document for printing through the GUI, the print driver 108 takes over, feeds data to the printer device 101 with the correct control commands. The print driver 108 receives the job request from the application and converts the request into a format that is understandable by the printer device 101. Upon receiving the print job request from the print driver 108, the printer device 101 executes and completes the print job request.

In an example, the print job request includes a request for printing an electronic document. The electronic document includes one or more hyperlinks pointing to one or more hyperlink destinations. Upon clicking a hyperlink, a program application may be launched to open the content located at the hyperlink destination.

In the context of the present disclosure, the print driver 108 includes a hyperlink processing module 110 that is a software module residing in the memory of the computing device 105 and configured to process the hyperlinks of the electronic document submitted for printing. In an embodiment, the hyperlink processing module 110 may not be a part of the print driver 108 and is a software application added/integrated to an existing print driver package.

The hyperlink processing module 110 is configured to: receive the electronic document for printing; analyze the electronic document; automatically detect or extract one or more hyperlinks; extract corresponding hyperlink destinations from the electronic document submitted for printing; create one or more reference pages to be appended at the end of the electronic document, the one or more reference pages include the hyperlinks and the corresponding hyperlink destinations; and submit the electronic document along with the one or more reference pages to the printer device 101 for printing. The printer device 101 prints all pages of the electronic document along with the reference pages listing the hyperlinks and the corresponding hyperlink destinations.

In some embodiments, the print driver 108 requests for a confirmation from the user via a graphical user interface (GUI), if he wants to print the reference pages containing the hyperlinks information. Upon receiving the user confirmation, the hyperlink processing module 110 generates a reference page containing the hyperlinks and corresponding destination information, and submits the same for printing by the printer device 101.

The memory and the processor are standard modules as known without deviating from the scope of the disclosure. In some cases, the processor is configured to implement the functionality of the hyperlink processing module 110.

Figure 2A:
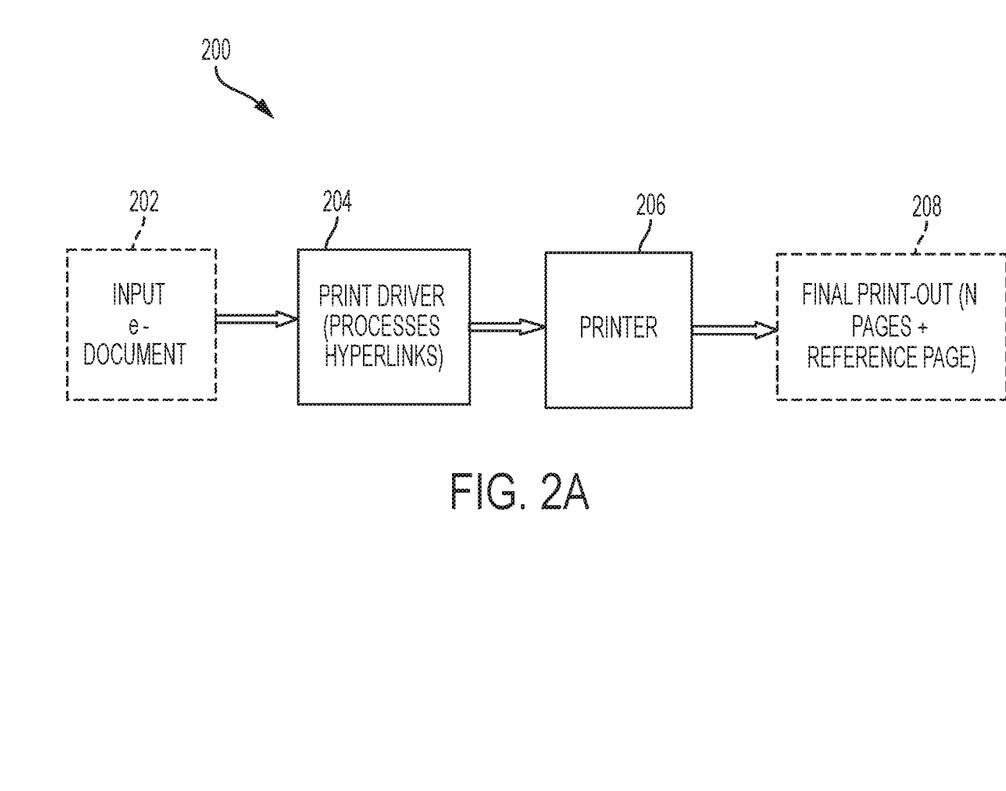
FIG. 2A illustrates a flow diagram for printing documents having hyperlinked text, in accordance with an embodiment.

FIG. 2A illustrates a flow 200 of printing of an input electronic document (e-document) 202 that contain hyperlinks, in accordance with an embodiment. As shown, the input includes an e-document 202, which is processed by a print driver 204 and the processed document is submitted to a printer 206 for printing. The output generated by the printer 206 is shown as a final print out 208. The final print out 208 includes all pages of the e-document 202 and a reference page. More details will be discussed below.

Figure 2B:
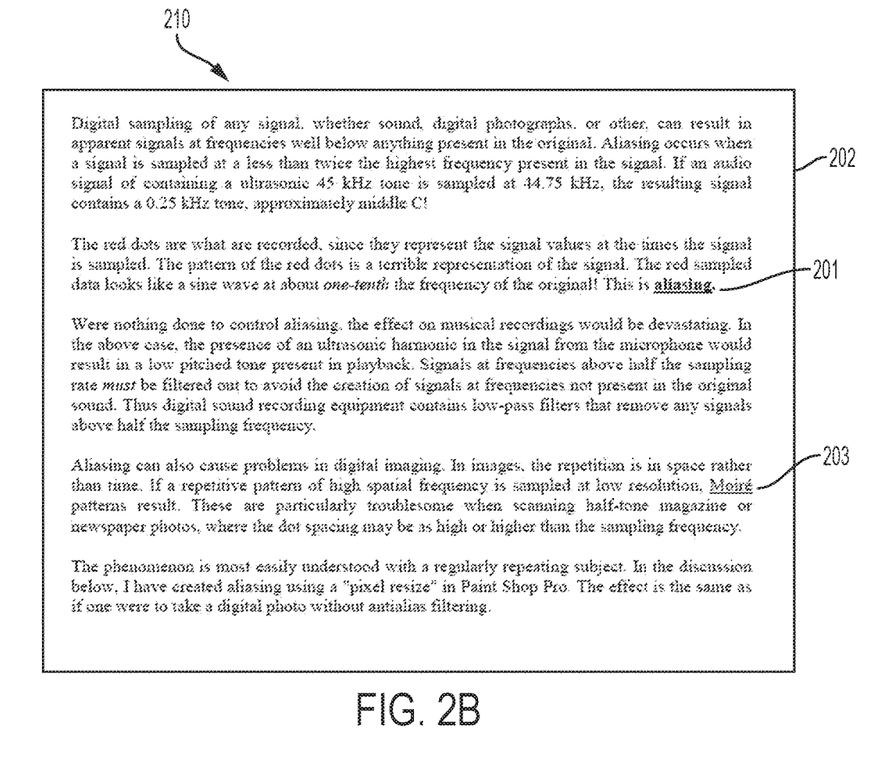
FIG. 2B illustrates an exemplary input e-document, in accordance with an embodiment.

Initially, a user submits the electronic document 202 for printing. The input e-document 202 includes one or more hyperlinks highlighted in a different color than the other content, and the user may access the hyperlink destinations while he is connected to the Internet. An example of one page input e-document 202 is illustrated with reference to FIG. 2B (snapshot 210). As shown, the input e-document 202 includes two hyperlinks "aliasing" (marked as 201) and "Moire" (marked as 203).

Referring back to FIG. 2A, when the user submits the input e-document 202 for printing via a user computing device or other user devices, a hyperlink processing module (although not shown) of the print driver 204 executing therein detects the hyperlinks, and processes the hyperlinks of the input e-document 202. The processing of the hyperlinks includes automatically extracting hyperlinks and corresponding URLs.

In an example, when the input e-document 202 is a Microsoft Word (MS) document, then the print driver 204 uses MS automation technology and corresponding Component Object Model (COM) interfaces for extracting URLs of hyperlinks embedded in the input e-document 202. In another example, when the input e-document 202 is a pdf document, the print driver 204 uses the open source library to extract URLs of the hyperlinks embedded in the input e-document 202. These are just few examples, but there can be many other ways for detecting the hyperlinks and extracting the hyperlinks.

Based on the processing, the print driver 204 adds a reference page to the input e-document 202 to create a final document for printing. Thereafter, the print driver 204 submits the final document 208 to a printer 206 (similar to the printer device 101) for printing. The printer 206 prints the final document such as a final document 208. The final document 208 includes all pages of the input e-document 202 and the reference page.

Figure 2D:
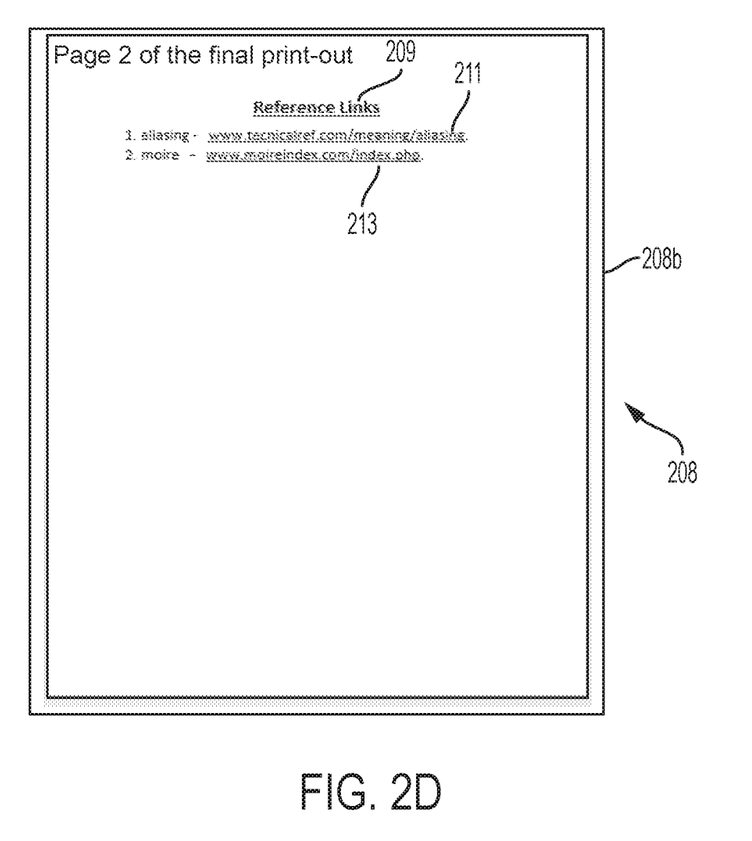
FIG. 2D illustrates an exemplary second page (i.e., a reference page) of a final print out of the input e-document, in accordance with an embodiment.

An example of the final document 208 printed by the printer 206 is illustrated with reference to FIGS. 2C and 2D. The final document 208 printed by the printer 206 includes a first page 208a and a reference page 208b added to the first page 208a. The reference page 208b is labeled as reference links (marked as 209) that includes hyperlinks and corresponding URLs related to the hyperlinks. In an example of FIG. 2D, the reference page 208b includes hyperlinks "aliasing" and "moire" and corresponding URLs 211 and 213, respectively.

Using the reference page 208b, the user can refer to more details of the document 202 or the hyperlinks. For example, if a user wants to refer any further details about that hyperlink word/phrase (201 or 203) then he may type the corresponding URL in the internet browser and views it. The information in the reference page 208b may be very helpful for the offline readers for any future reference, as they do not need to go back to the input e-document 202 for identifying hyperlinks or extracting more details.

Figure 3:
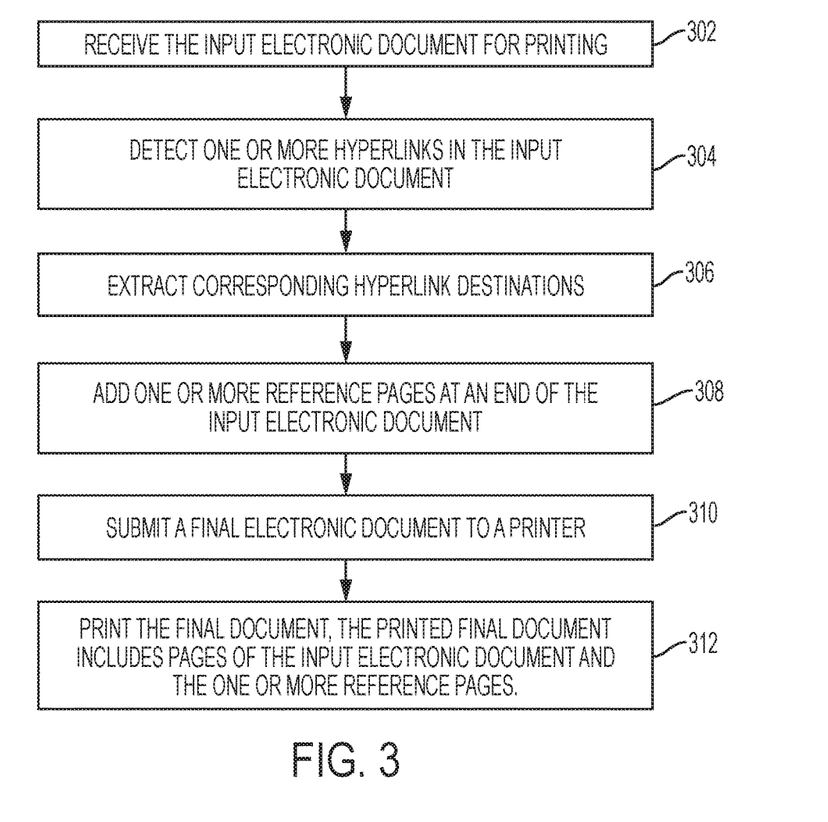
FIG. 3 is a flowchart illustrating a method of printing an electronic document, in accordance with an embodiment.

FIG. 3 is a flowchart illustrating a method of printing an electronic document, in accordance with an embodiment. In the context of the present disclosure, the method deals with documents containing one or more hyperlinks. The hyperlinks are generally formatted differently than the remaining text/content of the document. For example, the hyperlinks are bold, underlined, italics, or may have a different color and so on. It is easy to recognize the hyperlinks when reading the document online, but the information gets lost when the same document is printed. Therefore, it becomes difficult for users to refer to the hyperlinks or any associated information. As a result, the method of FIG. 3 solves the problem in a manner where the document is printed such that the hyperlinks remain original formatted as in the electronic format and additional information such as hyperlink destination (i.e., URL), etc., is provided for the user to refer when reading the printed document. Details of the method will be discussed below.

At 302, an input electronic document is received for printing. The electronic document is a soft copy. Various examples of format of the electronic document include but not limited to a Portable Document Format (PDF), a Microsoft (MS) DOC format, a Hypertext Markup Language (HTML) format, an Extensible Markup Language (XML) format, an MS XLS format, and a Tag Image File Format (TIFF). The electronic document includes one or more pages. Each page includes plain text (i.e., content which is not hyperlinked). At least one page includes one or more hyperlinks (i.e., text which is hyperlinked to a particular destination or a URL). The hyperlinks may be present in a format different from the plain text. For example, the hyperlinks may be highlighted, underlined, bold, different color or a combination thereof. The received electronic document is analyzed.

At block 304, automatically one or more hyperlinks are detected in the electronic document.

Upon detection, at block 306, hyperlink destinations corresponding to the one or more hyperlinks are extracted. An example of a hyperlink destination includes a Uniform Resource Locator (URL). The hyperlink destinations are extracted by opening links.

Based on the hyperlinks and corresponding hyperlink destinations, one or more reference pages are added at the end of the electronic document, at 308, the reference pages include the one or more extracted hyperlinks and corresponding hyperlink destination information. In some cases, a single reference page may be created or added at the end of the input electronic document, depending on the number of hyperlinks present in the electronic document. Thereafter, the reference pages are added at the end of the electronic document to create a final document for printing. At 310, the final document is submitted for printing to a printer.

At 312, the final document is printed, the printed final document includes pages of the input electronic document and the one or more reference pages. Here, printing includes printing each page of the electronic document as it is and printing the reference pages. The reference pages include the hyperlinks and corresponding hyperlink destinations. In this manner, the printed reference pages help the offline user to refer to the hyperlink printed information, for example, hyperlinked phrases and corresponding URLs.

The disclosure generally relates to methods and systems for printing documents containing hyperlinks. At the time of printing, the methods and systems print an additional reference page listing extracted hyperlinks and hyperlink destinations. The listed information thus may be very helpful for offline readers for any future reference, as they do not need to go back to the input electronic document for identifying hyperlinks. In this manner, the methods and systems are efficient.

It will be appreciated by a person skilled in the art that the exemplary embodiments are not restricted to any particular format print settings on a file or on a folder. The embodiments are intended to include or otherwise cover all permutations and combinations of print settings stored inside files/folders. Further, implementation of the embodiments may not require any hardware specific changes in printing devices, because various printing device software modules are sufficient in instructing printers according to the methods disclosed herein. It can therefore be beneficial to allow a user to use his/her portable memory devices for taking printouts with desired print settings, without much interaction with user interfaces of printers, and with minimal or no wait time.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing an input electronic document, the method comprising:
   receiving, by a hyperlink processing module, the input electronic document for printing;
   detecting, by the hyperlink processing module, hyperlinked text comprising one or more hyperlinks in the input electronic document;
   sending, by the hyperlink processing module, a request to a user for a confirmation whether the user wants to print one or more reference pages listing the hyperlinked text adjacent to one or more hyperlink destinations of the one or more hyperlinks;
   receiving, by the hyperlink processing module, the confirmation from the user;

in response to receiving the confirmation from the user, extracting, by the hyperlink processing module, the one or more hyperlink destinations;

adding, by the hyperlink processing module, the one or more reference pages to the input electronic document to create a final document for printing, wherein the one or more reference pages list both the hyperlinked text and the corresponding one or more hyperlink destinations;

submitting, by a printer driver, the final document to a printer; and printing the final document comprising pages corresponding to the input electronic document and the one or more reference pages to yield a printed final document, wherein the printed final document enables the user to identify and access the one or more hyperlink destinations, corresponding to the hyperlinked text in the printed final document, without having to refer to the input electronic document.

2. The method as claimed in claim 1, wherein a format of the input electronic document is selected from a group consisting of: a Portable Document Format (PDF), a Microsoft (MS) DOC format, a Hypertext Markup Language (HTML) format, an Extensible Markup Language (XML) format, an MS XLS format, and a Tag Image File Format (TIFF).

3. The method as claimed in claim 1, wherein a hyperlink destination comprises a Uniform Resource Locator (URL).

4. The method of claim 1, wherein the printer driver comprises the hyperlink processing module.

5. A method for printing an electronic document, the method comprising:

receiving, by a hyperlink processing module, the electronic document for printing;

detecting, by the hyperlink processing module, hyperlinked text comprising one or more hyperlinks in the electronic document;

requesting, by the hyperlink processing module, a confirmation from a user that the user wants to print one or more reference pages listing the hyperlinked text adjacent to one or more hyperlink destinations of the one or more hyperlinks;

extracting, by the hyperlink processing module, the one or more hyperlink destinations, upon receiving the confirmation from the user;

creating, by the hyperlink processing module, the one or more reference pages, wherein the one or more reference pages list both the hyperlinked text and the corresponding one or more hyperlink destinations;

adding, by the hyperlink processing module, one or more reference pages to the electronic document to generate a final document for printing;

submitting, by a printer driver, the final document to a printer; and printing the final document comprising pages corresponding to the electronic document and the one or more reference pages to yield a printed final document, wherein the printed final document enables the user to identify and access the one or more hyperlink destinations, corresponding to the hyperlinked text, without having to refer to the electronic document.

6. The method as claimed in claim 5, wherein a hyperlink destination comprises a Uniform Resource Locator (URL).

7. The method of claim 5, wherein the printer driver comprises the hyperlink processing module.

8. A system for printing an input electronic document that contains one or more hyperlinks, the system comprising:

a computing device communicatively coupled to a printer device, the computing device comprising a memory for storing one or more instructions, and a processor in communication with the memory, wherein upon execution of the one or more instructions, the processor is configured to:

receive the input electronic document for printing;

detect hyperlinked text comprising the one or more hyperlinks in the input electronic document;

sending a request to a user for a confirmation of whether the user wants to print one or more reference pages listing the hyperlinked text adjacent to one or more hyperlink destinations of the one or more hyperlinks;

in response to receiving the confirmation from the user, extract the one or more hyperlink destinations;

add the one or more reference pages to the input electronic document to create a final document for printing, wherein the one or more reference pages list both the hyperlinked text and the corresponding one or more hyperlink destinations; and submit the final document, to the printer device; and the printer device configured to print the final document to yield a printed final document comprising pages corresponding to the input electronic document and the one or more reference pages;

wherein the printed final document enables the user to identify and access the one or more hyperlink destinations, corresponding to the hyperlinked text, without having to refer to the input electronic document.

9. The system as claimed in claim 8, wherein a format of the electronic document is selected from a group consisting of: a Portable Document Format (PDF), a Microsoft (MS) DOC format, a Hypertext Markup Language (HTML) format, an Extensible Markup Language (XML) format, an MS XLS format, and a Tag Image File Format (TIFF).

10. The system as claimed in claim 8, wherein a hyperlink destination comprises a Uniform Resource Locator (URL).

11. The system of claim 8, wherein the memory comprises a hyperlink processing module configured to receive, detect, end, extract, and add.

12. The system of claim 8, wherein the memory comprises a printer driver configured to submit.

13. The system of claim 12, wherein the printer driver comprises a hyperlink processing module configured to receive, detect, end, extract, and add.

14. A computing device, comprising:

a hyperlink processing module configured to:

receive an electronic document, wherein the electronic document includes one or more pages, wherein at least one page comprises one or more hyperlinks;

analyze the electronic document to detect hyperlinked text comprising the one or more hyperlinks;

send a request to a user for a confirmation of whether the user wants to print one or more reference pages listing the hyperlinked text adjacent to one or more hyperlink destinations of the one or more hyperlinks;

receive the confirmation from the user through a Graphical User Interface (GUI) of the computing device;

extract the one or more hyperlink destinations, upon receiving the confirmation from the user;

create the one or more reference pages, wherein the one or more reference pages list both the hyperlinked text and the corresponding one or more hyperlink destinations; and submit the electronic document along with the one or more reference pages to a printer driver; and the printer driver communicatively coupled to the hyperlink processing module for submitting the electronic document along with the one or more reference pages, to a printer device to yield a printed document comprising pages corresponding to the electronic document and the one or more reference pages, wherein the printed document enables the user to identify and access the one or more hyperlink destinations, corresponding to the hyperlinked text, without having to refer to the electronic document.

15. The computing device as claimed in claim 14, wherein the hyperlinked text is formatted differently than other text in the electronic document.

16. The computing device as claimed in claim 14, wherein the hyperlinked text included in the at least one page is printed with an original format.

17. The computing device as claimed in claim 14, wherein a format of the electronic document is selected from a group consisting of: a Portable Document Format (PDF), a Microsoft (MS) DOC format, a Hypertext Markup Language (HTML) format, an Extensible Markup Language (XML) format, an MS XLS format, and a Tag Image File Format (TIFF).

18. The computing device as claimed in claim 14, wherein a hyperlink destination comprises a Uniform Resource Locator (URL).

19. The computing device of claim 14, wherein the printer driver comprises the hyperlink processing module.

* * * * *